United States Patent

[11] 3,631,609

[72] Inventor  Steven A. Warren
       480 Saunders Road, Lake Forest, Ill. 60045
[21] Appl. No. 888,227
[22] Filed     Dec. 29, 1969
[45] Patented  Jan. 4, 1972

[54] TRAINING SYSTEM AND TACHISTOSCOPE FOR USE THEREIN
10 Claims, 6 Drawing Figs.

[52] U.S. Cl. .................................................. 35/9 E, 35/35 B
[51] Int. Cl. .......................................... G09b 3/06, G09b 17/04
[50] Field of Search ........................................ 35/9 R, 9 B, 35 B

[56] References Cited
UNITED STATES PATENTS

| | | | |
|---|---|---|---|
| 3,144,720 | 8/1964 | Kehl | 35/9 B |
| 3,358,391 | 12/1967 | Warren et al. | 35/35 B |
| 3,482,332 | 12/1969 | Hvale et al. | 35/35 B |
| 3,529,364 | 9/1970 | Warren | 35/35 B |

Primary Examiner—Wm. H. Grieb
Attorney—Dressler, Goldsmith, Clement & Gordon

ABSTRACT: A tachistoscopic device for use with a sheet of symbols to be recognized when momentarily exposed. The device includes a frame having a symbol viewing window, and a shutter is movable past the window to momentarily expose the symbol to be viewed. The sheet of symbols preferably includes a plurality of sets of symbols, each set including a symbol to be viewed, such as a question, and an evaluation symbol to be compared therewith, such as a multiple choice answer. The sheet also includes a marking zone for each question with each zone having a plurality of circumferentially spaced areas, each area corresponding to one answer of said multiple choice answers. A manually operable rotary marking device is mounted on the frame for marking a selected area of the sheet after the questions have been flashed and the multiple choice answers have been exposed.

PATENTED JAN 4 1972
3,631,609
SHEET 1 OF 2
Fig. 1
Fig. 4
Fig. 2
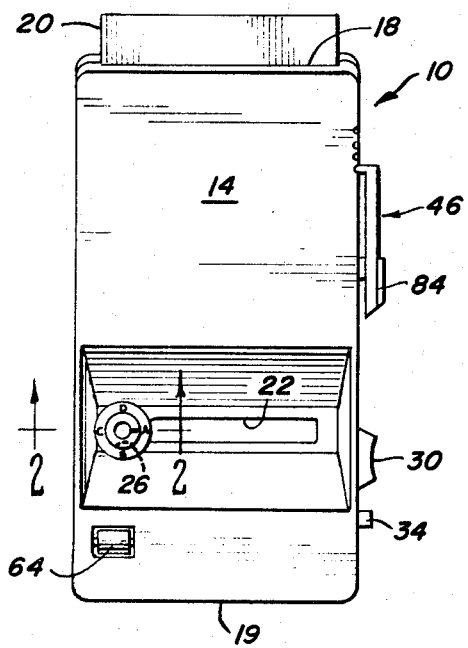
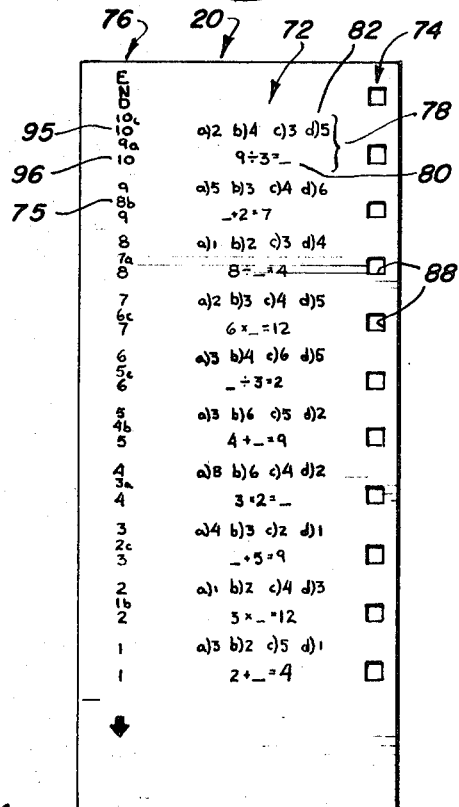
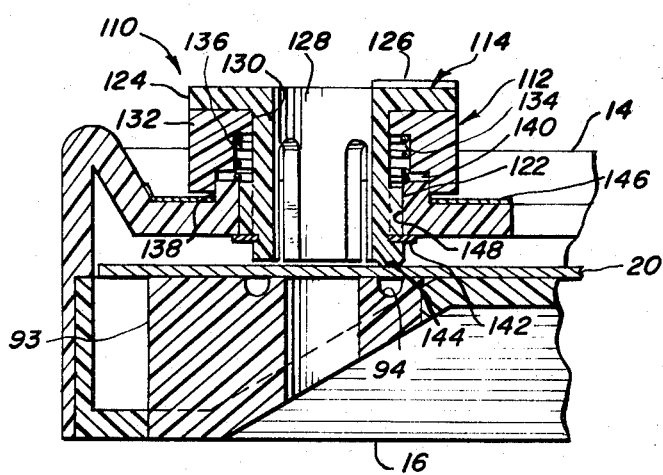
INVENTOR
Steven A. Warren
BY Dressler, Goldsmith, Clement & Gordon
ATTORNEYS INVENTOR
Steven A. Warren
BY Dressler, Goldsmith, Clement & Gordon
ATTORNEYS 3,631,609

TRAINING SYSTEM AND TACHISTOSCOPE FOR USE THEREIN

BACKGROUND OF THE INVENTION

The tachistoscopic device of the present invention is an improvement upon the near-point tachistoscope disclosed in Warren et al. U.S. Pat. No. 3,358,391. The device of the above-mentioned patent provides a relatively simple means for momentarily exposing or "flashing" symbols for recognition by a person seeking to improve his reading skills by speeding up his rate of recognition of such symbols.

In my pending application Ser. No. 699,633, filed Jan. 22, 1968, an improved tachistoscopic device and flash recognition training system are disclosed wherein the user of the device can mark the sheet of symbols after he compares the symbols with a separate sheet of evaluation symbols. While this improved structure and system has proven to be highly desirable, it is somewhat troublesome to have to use two separate sheets to compare the symbols to be recognized with the evaluation symbols.

In my pending applications Ser. Nos. 803,581 and 809,191 filed Mar. 3, 1969 and Mar. 21, 1969, respectively, a still further improved tachistoscopic device is disclosed wherein a novel sheet feeding means cooperates with a single sheet having sets of both viewing and evaluation symbols thereon to facilitate marking of the sheet after a viewable symbol has been flashed and compared with an evaluation symbol.

SUMMARY OF THE INVENTION

In order to facilitate concentration and interest and improve the speed and ability of the tachistoscope user to compare the viewed symbol with an evaluation symbol, the present invention includes a single sheet having viewable symbols thereon in the form of questions and evaluation symbols thereon in the form of multiple choice answers. The single sheet also includes the correct answers to each of the multiple choice questions, and the tachistoscope shields the correct answer for each respective question during flashing of the question and exposure of the multiple choice answers. The sheet further includes a marking zone for each question, and each marking zone is divided into a plurality of circumferentially spaced marking areas, one for each answer of each multiple choice answer. Marking means is provided on the tachistoscope, and the marking means includes a rotary marking device that is manually operable for making an indication on the sheet in each of the marking zones of the sheet to record the answer that has been selected by the tachistoscope user. The tachistoscope includes means shielding each correct answer from exposure until after the multiple choice answer has been evaluated and the marking means actuated.

BRIEF DESCRIPTION OF THE DRAWINGS

FIG. 1 is a top plan view of a tachistoscope formed in accordance with the present invention;

FIG. 2 is an enlarged sectional view taken along line 2—2 of FIG. 1;

FIG. 4 is a plan view of the front side of a sheet of symbols usable with the tachistoscope of the present invention;

DESCRIPTION OF THE PREFERRED EMBODIMENT

Figure 3:
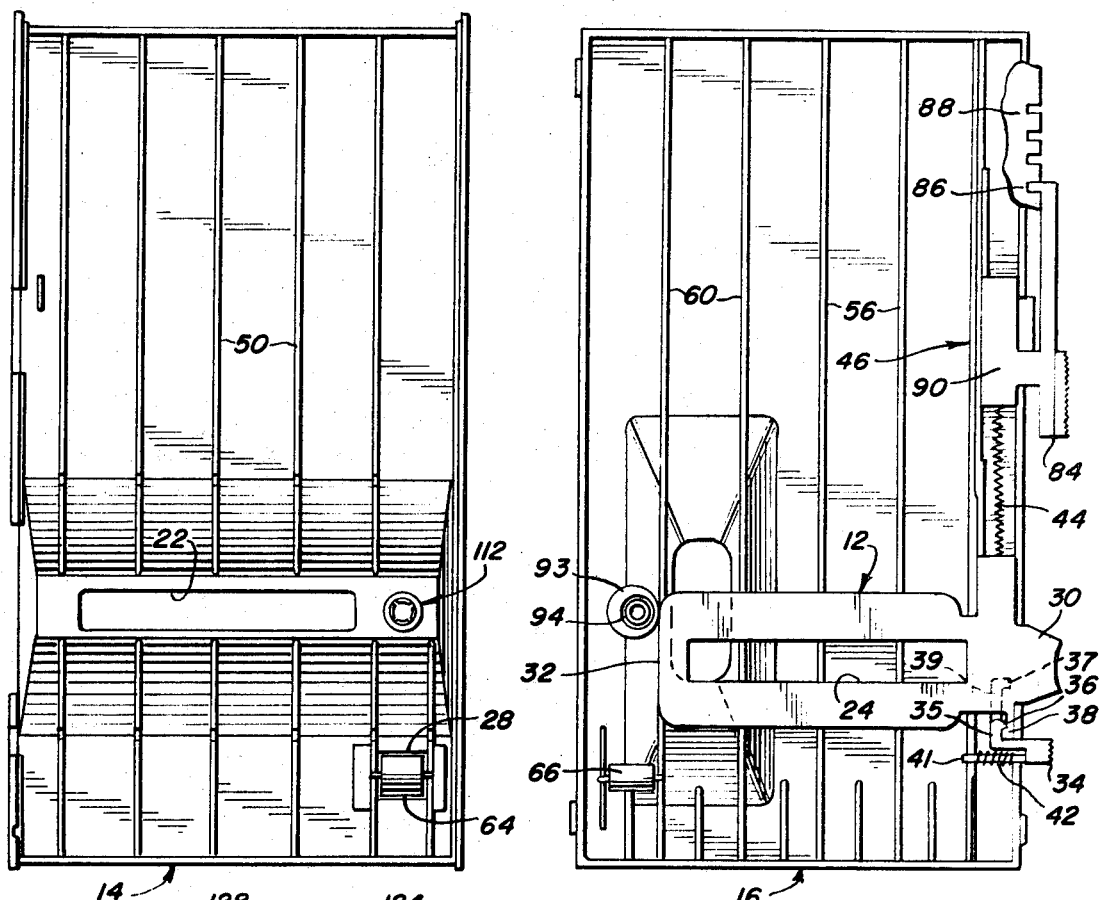
FIG. 3 is an enlarged lay open plan view of the top and bottom parts of the tachistoscope.
Figure 6:
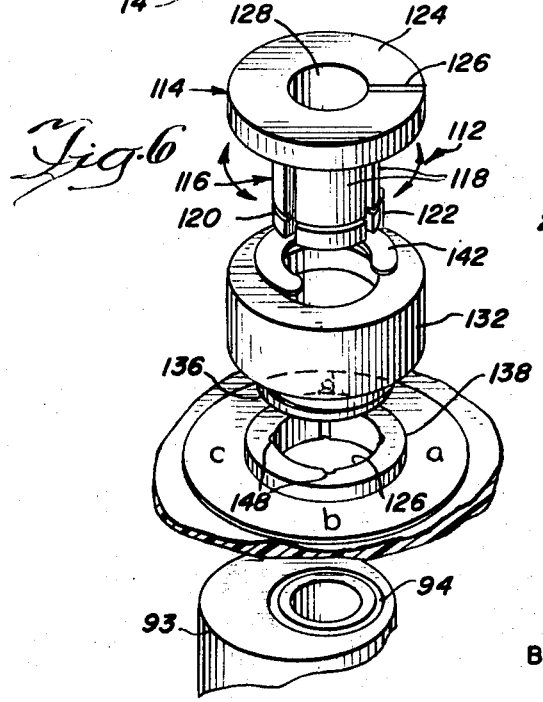
FIG. 6 is an exploded perspective view primarily illustrating the sheet marking mechanism of the tachistoscope.
Figure 5:
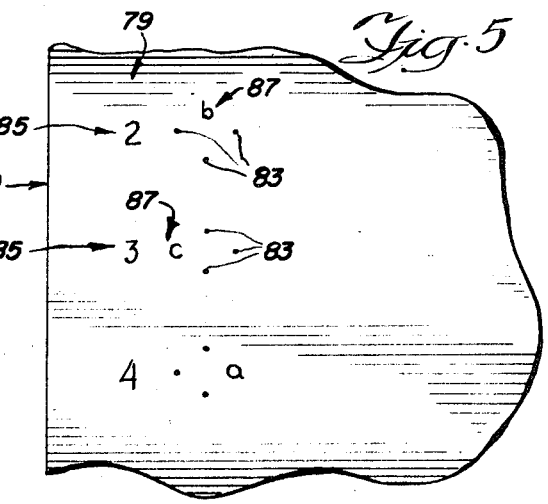
FIG. 5 is an enlarged fragmentary plan view of the back side of the sheet of symbols.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

The tachistoscope of the present invention is illustrated generally at 10 in FIG. 1, and includes an exposure control member in the form of a shutter 12 (FIG. 3) which is positioned within a chamber formed by a top container member 14 and a bottom container member 16. Mating members 14 and 16 define an entrance slot 18 at one end of the tachistoscope 10 and an exit slot 19 at the opposite end of the tachistoscope. To use the tachistoscope 10, a sheet of symbols 20 is inserted through slot 18, and pushed into operating position within the tachistoscope. An advancing mechanism is actuated to sequentially index the sheet 20 through the tachistoscope and out of slot 19.

Near its end opposite slot 18, top container member 14 is provided with a viewing window defined by a generally rectangular aperture 22, through which the user of the tachistoscope may view the symbols on sheet 20 when a portion of the sheet is exposed through slot 24 (FIG. 3) in exposure control member 12. Container member 14 is also provided with an aperture 26 adjacent viewing aperture 22, with an indexing symbol on sheet 20 being movable into alignment with aperture 26 when a symbol to be viewed is moved into alignment with aperture 22.

As is best seen in FIG. 3, exposure control member 12 consists of movable shield 32 having exposure slot 24 defined therein. Exposure control member 12 carried finger tab 30, which extends outside the chamber formed by mating container members 14 and 16 to an exposed position that permits the user of the device to move the exposure control member into the cocked position, as is described in detail in my above-mentioned copending applications.

Trigger means 34 extends outside the chamber formed by mating container members 14 and 16, and trigger means 34 includes a latch member 35 having a hook 36 thereon for engaging and releasing, as desired, a complementary hook 38 (best seen in FIG. 3) at the end of bolt means 40 carried by exposure control member 12. Latch member 35 includes a further hook 37 at the end of a thin, elongate finger 39, and hook 37 is also engageable with hook 38 for releasably retaining the shutter 12 in a comparison position, as will hereinafter appear. Because of the thinness of finger 39, different sounds and a different feel will be created when hooks 36 and 37 are engaged, so that the tachistoscope user can aurally, as well as visually, readily determine the position of the shutter 12.

A coil spring 42 surrounds a stem 41 on latch member 35 and biases the latch member to a position where either hook 36 or hook 37 holds hook 38. The slanted ends of hooks 36, 37 and 38 permit hook 38 to ride over hooks 36 and 37 whenever the user of the tachistoscope presses finger tab 30 downward to the point where the hooks engage each other. Trigger means 34 and its biasing spring 42 cooperate with bolt means 40 on exposure control member 12 to permit the exposure control member to be selectively cocked and released and to permit the exposure control member to be releasably retained in the comparison position.

Tension means 44 is connected at one end to exposure control member 12, and at the other end to a time control mechanism 46. Time control mechanism 46, as is explained in detail in the above-mentioned Warren et al. patent, is employed to govern the time of exposure that is produced when exposure control member 12 is triggered from its cocked condition into its discharge position to cause momentary exposure of symbols on sheet 20 when exposure slot 24 passes through a position of alignment with viewing aperture 22 in top container member 14. As is seen from FIG. 3, the time control mechanism 46 is included within the single chamber formed of the two mating container members 14 and 16, except for an exposed portion 84 that protrudes out of the container for adjustment by the user of the tachistoscope. The time control mechanism includes a main body 90 mounted for sliding movement between the right-hand side of member 16 and the rib 56 adjacent thereto, and a protuberance 86 on the time control mechanism may be selectively positioned in any of a plurality of indentations 88 in the outer sidewall of top container member 14.

Corresponding parts of mating container members 14 and 16 will be aligned when these two members are assembled in the manner described. Parallel rib members 50 in top member 14 will lie above parallel rib members 56 in bottom member 16, with the plane of rib edges being spaced by a distance slightly greater than the thickness of sheet of symbols 20, to provide a space for the movement of said sheet. The exposure control member 12 helps to confine the sheet of symbols 20 against the upper edges 60 of parallel rib members 56 of bottom mating member 16. The sheet of symbols 20 is also supported upon the upper surface of a backup member 93 between rib 56 adjacent the left-hand side of exposure control member 12.

The front side of sheet of symbols 20 includes a generally centrally disposed column 72 of sets of symbols, and a column 76 of indexing and feedback symbols adjacent the left-hand edge of the sheet. A column 74 of means enabling the sheet to be indexed through the tachistoscope 10 is provided at the right-hand edge of the sheet, as viewed from the front side. A column 79 of checking or grading zones is provided on the rear side of sheet 20 in alignment with column 76. The column 72 includes a plurality of sets 78 of symbols, each set including a viewable symbol 80 to be recognized when exposed and an evaluation symbol 82 to be compared with the viewable symbol. The symbols 80 and 82 preferably have different colors, so that the user of the tachistoscope can readily distinguish between them, and in an exemplary embodiment, the viewable symbols are black while the evaluation symbols are red. In order to make the tachistoscope more enjoyable to use, and to increase the user's concentration, the viewable symbols 80 are in the form of questions and the evaluation symbols 82 are in the form of multiple choice answers. While mathematical questions are illustrated in the drawings, it should be understood that the invention is not limited thereto, and purely verbal questions could be used.

The column 76 of indexing symbols includes a pair of identifications symbols 95 and 96 for each set of symbols 78, which are movable into alignment with aperture 26 to indicate the index position of the sheet 20 to the user of the tachistoscope. The column 76 also preferably includes "start" and "stop" indicia at the lower and upper ends thereof, respectively, for advising the user of the tachistoscope of the position of the sheet 20 relative to the tachistoscope frame. Column 76 further includes feedback symbols 75 giving the correct answer to a flashed question, and the function of these symbols will be hereinafter explained. The means enabling the sheet 20 to be indexed relative to the tachistoscope includes a plurality of spaced openings 88 that are adapted to be engaged by means associated with exposure control member 12. Column 79 includes a question identification symbol 85, and a correct answer symbol 87. In the illustrated embodiment, each answer of the multiple choice answers is identified by a lower case letter designator, and the correct answer symbols preferably include a corresponding letter designator to be marked by a marking device to be hereafter described. Each zone in column 79 includes a plurality of circumferentially spaced marking areas 83, each area corresponding to an answer of the multiple choice answers. The marking areas 83 may each include a letter designator, although in the illustrated embodiment, only the correct answer letter designator 87 is provided.

In order to index the sheet 20, exposure control member 12 is provided with abutment means in the form of a downwardly extending pin (not shown), and the pin is positioned in alignment with the row of openings 88 when the sheet 20 is positioned within the tachistoscope 10. As is explained in the above-mentioned copending application, the indexing pin has an inclined surface, so that the sheet can be moved past the pin without tearing when it is initially placed in the tachistoscope. When the "start" indicia of column 76 is visible through aperture 26, the pin is received within the first opening 88 and when the exposure control member 12 is moved downwardly into the cocked position, the pin engages against the edge of the opening to index the sheet 20 to a position wherein the viewable symbol 80 of the first set of symbols is aligned with the aperture 22, and the first indexing symbol 96 is aligned with aperture 26.

When the trigger 34 is pushed inwardly to disengage hooks 36 and 38, spring 44 moves the exposure control member upwardly at a rate determined by the setting of the time control mechanism 46. As the slot 24 in the exposure control member 12 moves past the viewable symbol 80, the question is momentarily exposed through aperture 22 for recognition by the tachistoscope user. After the symbol 80 has been exposed, the exposure control member 12 is pulled downwardly against the bias of spring 44 to shift sheet 20 downwardly and to engage the hook 37 on the trigger 34 with the hook 38. This locates the slot 24 in the exposure control member in a position exposing the multiple choice answer evaluation symbol 82 through the aperture 22, so that the answer to the question can be selected. During movement of the exposure control member 12 from the released position to the comparison position, the portion of the upper member 14 below aperture 22 covers the previously exposed symbol 80 while the portion of member 12 above aperture 24 covers the symbol 80 to be subsequently exposed. After the evaluation symbol 82 has been exposed and the answer selected, sheet marking means 110 is actuated to mark column 79 on sheet 20.

Marking means 110 includes a pushbutton assembly 112 that is rotatably mounted within aperture 26 in frame member 14. Pushbutton assembly 112 includes a first member 114 having a generally vertical stem 116 formed of a plurality of circumferentially spaced members 118, and a groove 120 is provided in stem members 118 adjacent the lower end thereof. A rib 122 extends outwardly from one of the stem members 118 to define a portion of a detent means for releasably retaining the pushbutton assembly 112 in one of a plurality of selectable positions. A flange 124 extends outwardly from the upper end of member 114, and an indicator in the form of a radially extending rib 126 is provided on the upper surface of flange 124. Member 114 includes a central opening 128 therein, and opening 128 provides a means whereby the symbols in column 76 can be viewed by the user of the tachistoscope, as is evident from FIG. 2.

Member 114 is nonrotatably mounted within a central opening 130 of a second member 132 of the pushbutton assembly 112, and member 132 has a first counterbored portion 134 that provides a seat for a helical spring 136. The opposite end of spring 136 is seated upon an upraised, generally cylindrical portion 138 of frame member 14, and member 132 includes a further counterbored portion 140 that is slidably mounted on an upwardly extending cylindrical frame portion 138. Retention means, such as a C-clip 142, is seated within grooves 120 to retain the pushbutton assembly 112 upon the frame member 14.

As is evident from FIG. 2, backup member 93 is positioned below the pushbutton assembly 112, and an upwardly facing circumferential groove 94 is provided in the upper surface of the backup member. A marking member in the form of a downwardly extending projection 144 is provided on one of the stem members 118 in radial alignment with groove 94. Thus, when the pushbutton assembly 112 is moved downwardly against the bias of spring 136, projection 144 will engage the sheet 20 to deform or pierce the sheet and thereby create a permanent record.

An indicator plate 146 is provided on frame member 14 around cylindrical projection 138, and plate 146 includes a plurality of designators, such as lower case letters, that are spaced circumferentially with respect to one another. Each of the designators corresponds to one answer of the multiple choice answers, and in the illustrated embodiment, four designators are used and are positioned 90° apart from one another. The detent means for releasably retaining the pushbutton assembly further includes a plurality of axially extending recesses 148 in opening 126 for releasably retaining projection 122, and in the illustrated embodiment, four recesses 148 are provided in radial alignment with the designators on plate 146.

After the viewing sheet 20 has been inserted into the device, and the pushbutton 112 depressed so that the marking device 144 engages the sheet, a record of the answer that has been selected by the user will be provided on the sheet 20. The feedback symbol 75 for each multiple choice answer will be exposed through the opening 128 in the pushbutton assembly when the exposure control member has been moved from the released position to the comparison position and the viewing sheet has been moved to locate the next succeeding question in position to be flashed, so that the user of the tachistoscope will be aware of a correct or incorrect answer before proceeding to answer all of the questions on the sheet 20. However, as is evident from the foregoing, the feedback symbols 75 will not be exposed until after the sheet has been marked (unless that particular problem is skipped by the user), and the sheet has been moved on to position the next succeeding problem for flashing. Thus, with this device it is not possible to cheat. The procedure is repeated until all of the questions have been viewed and the multiple choice answers evaluated, and the "end" indicia moves into registration with aperture 26. The sheet 20 is indexed once again, and removed from the tachistoscope through slot 19.

As an alternative or supplementary sheet advancing means, a rubber roller 64 may be rotatably mounted in an aperture 28 adjacent the lower left-hand end of the top member 14, with the roller 64 being positioned in sheet feeding relationship with a roller 66 carried by bottom member 16. Rollers 64 and 66 are arranged to provide a sufficient pressure between them that sheet 20 will be reliably advanced whenever roller 64 is rotated by the user. The pressure between the rollers also provides a braking effect that will hold sheet 20 in the position selected by the user of the tachistoscope until roller 64 is actuated again. The drag created by rollers 64 and 66 is not sufficient to impede the normal indexing movement of sheet 20 by the above-mentioned indexing pin.

What is claimed is:

1. A flash recognition training system comprising: a viewing sheet having a question and multiple choice answer thereon, said sheet also having the correct answer to said question thereon; a tachistoscopic device cooperating with said sheet for flashing said question to a viewer; means on said tachistoscopic device for exposing the multiple choice answer after the question has been flashed; means on said tachistoscope for marking a selected answer on said sheet; and means on said tachistoscope blocking exposure of said correct answer during flashing of said question and exposure of said multiple choice answer and exposing said correct answer only after the next succeeding question has been moved into position to be flashed.

2. A flash recognition training system as set forth in claim 1 wherein said viewing sheet has a series of questions thereon to be flashed to the tachistoscope user, and a series of multiple choice answers thereon, each multiple choice answer corresponding to one of said questions, said sheet also having thereon the correct answer to each of said questions.

3. A flash recognition training system as set forth in claim 2 wherein said sheet includes a grading zone that is marked by said marking means.

4. For use with a sheet having a plurality of questions to be recognized when momentarily exposed, and a multiple choice answer for each question to be evaluated after a question has been viewed, said sheet also having a marking zone for each question with each zone having a plurality of circumferentially spaced marking areas, each area corresponding to one answer of said multiple choice answers, a tachistoscope comprising: a frame; a manually operable shutter mechanism mounted on said frame, said frame having a slot for receiving said sheet and a viewing window for exposing the questions when said shutter mechanism is actuated and for exposing the multiple choice answers after the questions have been exposed; and a manually operable marking device rotatably mounted on said frame, said marking device having a sheet marking member positionable to mark a selected area of each marking zone of said sheet, immediately following the viewing of a question and evaluation of the corresponding multiple choice answer.

5. A tachistoscope as set forth in claim 4 including means on said frame mounting said marking device for vertical movement, and spring means biasing said marking device upwardly into a position for manual actuation, said marking member being adapted to mark said sheet upon movement of said marking device downwardly against the bias of said spring means.

6. A tachistoscope as set forth in claim 5 wherein said frame means includes a backup member beneath said marking device for supporting said sheet.

7. A tachistoscope as set forth in claim 6 wherein the upper surface of said backup member includes an upwardly facing circumferential recess having an axis coincident with the axis of rotation of said marking device, said marking member being defined by a projection extending downwardly from said marking device, whereby when said marking device is moved downwardly against said biasing means, said projection forces a portion of said sheet into said recess to create a permanent record in said sheet 8. A tachistoscope as set forth in claim 4 wherein said frame includes means defining a plurality of selectable positions for said marking device, each position corresponding to an answer of said multiple choice answers, said tachistoscope further including detent means for releasably retaining the marking device in a selected position.

9. A training system comprising: a viewing sheet having a question and multiple choice answer thereon, said sheet also having the correct answer to said question thereon; means cooperating with said sheet for exposing said question to a viewer; means for exposing the multiple choice answer after said question has been exposed and then blocked from view again; means for marking a selected answer on said sheet; and means blocking exposure of said correct answer during exposure of said question and said multiple choice answer and exposing said correct answer only after the next succeeding question has been moved into position to be flashed.

10. A training system as set forth in claim 9 wherein said means for exposing said question includes a tachistoscope having a shutter mechanism for momentarily exposing said question.

* * * * *